US007788779B2

(12) United States Patent
Frenken

(10) Patent No.: US 7,788,779 B2
(45) Date of Patent: Sep. 7, 2010

(54) PRESSING DEVICE

(75) Inventor: Egbert Frenken, Wermelskirchen (DE)

(73) Assignee: Gustav Klauke GmbH (DE)

( * ) Notice: Subject to any disclaimer, the term of this patent is extended or adjusted under 35 U.S.C. 154(b) by 444 days.

(21) Appl. No.: 10/498,023

(22) PCT Filed: Dec. 9, 2002

(86) PCT No.: PCT/EP02/13948

§ 371 (c)(1),
(2), (4) Date: Jan. 28, 2005

(87) PCT Pub. No.: WO03/049883

PCT Pub. Date: Jun. 19, 2003

(65) Prior Publication Data

US 2005/0125978 A1 Jun. 16, 2005

(30) Foreign Application Priority Data

Dec. 8, 2001 (DE) ................................ 101 60 349
Dec. 28, 2001 (DE) ................................ 101 64 028

(51) Int. Cl.
*B23P 19/04* (2006.01)

(52) U.S. Cl. .............................. 29/237; 29/270; 72/402

(58) Field of Classification Search ................... 72/404, 72/416, 453.16, 453.15, 292, 452.2, 552.1, 72/402; 29/237, 268, 270, 278
See application file for complete search history.

(56) References Cited

U.S. PATENT DOCUMENTS 2,211,008 A 8/1940 Goldberg
2,547,748 A * 4/1951 Freer .......................... 81/3.43
2,557,202 A * 6/1951 Raymond et al. ........... 269/201
3,662,450 A 5/1972 Kish et al.
4,524,959 A * 6/1985 Kubo .......................... 269/43
5,353,623 A * 10/1994 Bobenhausen ............... 72/416
5,666,711 A * 9/1997 Pfeiffer ....................... 29/272
5,697,135 A 12/1997 Dischler
6,044,681 A * 4/2000 Frenken ....................... 72/292
6,044,686 A * 4/2000 Dischler ...................... 72/402
6,405,411 B1 * 6/2002 Allemann et al. .............. 24/19
6,457,338 B1 * 10/2002 Frenken ...................... 72/20.1
6,477,757 B2 * 11/2002 Viegener ..................... 29/237
6,772,618 B2 * 8/2004 Frenken ................... 72/409.16
6,923,037 B2 8/2005 Bowles et al.
2005/0125978 A1 * 6/2005 Frenken ....................... 29/237
2008/0276683 A1 * 11/2008 Frenken ....................... 72/402

* cited by examiner

*Primary Examiner*—Lee D Wilson
(74) *Attorney, Agent, or Firm*—Clark Hill PLC

(57) ABSTRACT

Disclosed is a pressing device (1) for compressingly joining pipe-shaped workpieces, particularly a pipe end (2) and a fitting (3) mounted thereon. At least one of the workpieces is plastically deformed by several press members which are movable along a central longitudinal axis of the workpieces for performing the compression. In order to produce a pressing device with several compression jaws that are comparatively easy to mount and allow the press members to be engaged as centrally as possible during compression, at least two press members are pivotally connected to each other by means of two articulated levers embodied as angle levers for applying compression force. The angle levers pressingly lean on a (first) press member (5), and both angle levers are train-connected to the same (second) press member (6).

26 Claims, 10 Drawing Sheets

Fig: 21
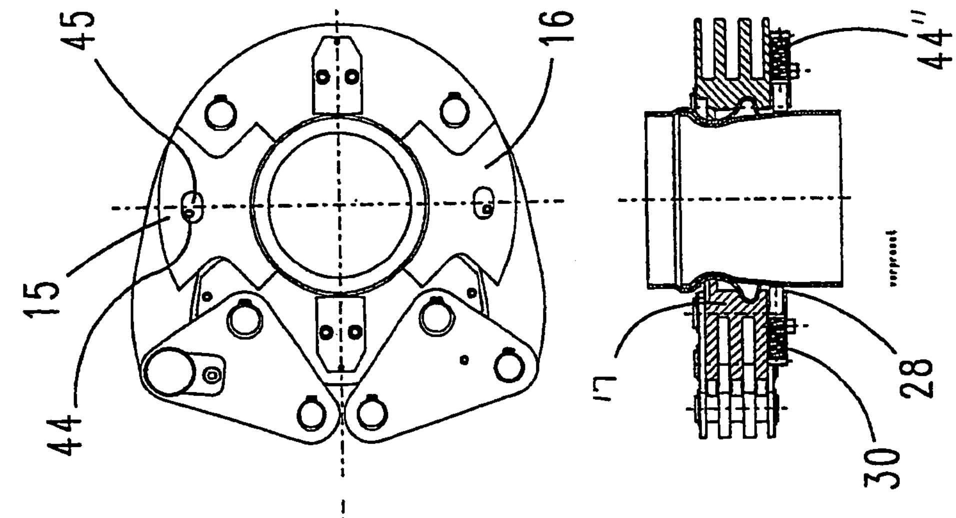
Fig. 21a
Fig: 20
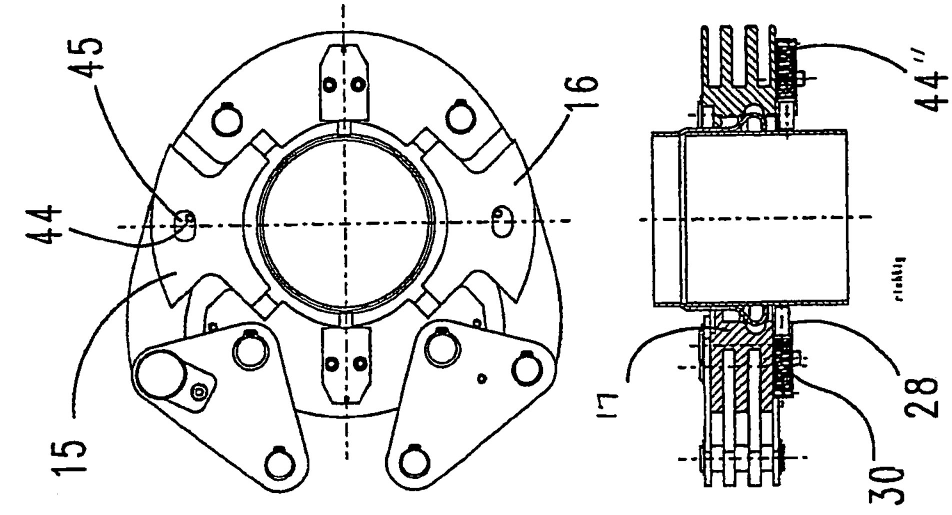
Fig. 20a
Fig: 19
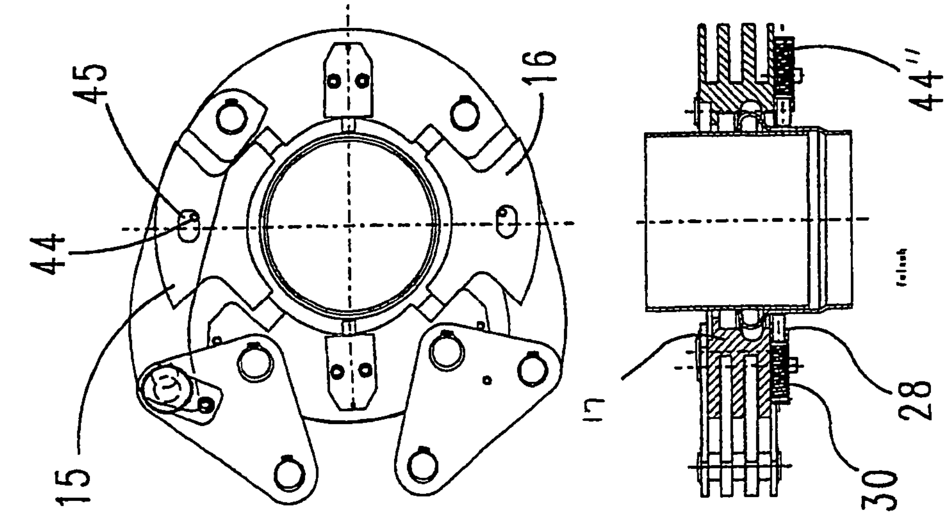
Fig. 19a

PRESSING DEVICE

The invention relates to a pressing device for the press-joining of tubular workpieces, in particular of a tube end, on the one hand, to a fitting slipped onto it, on the other hand, with plastic deformation of at least one of the workpieces, having a plurality of press members, it being possible for the press members to be moved toward a central longitudinal axis of the workpieces in order to carry out the pressing.

A pressing device of this type is known, for example, from U.S. Pat. No. 3,662,450. An advantage of this known pressing device is that the individual press members can be moved centrally toward the longitudinal axis of the workpieces which are to be joined. However, this known pressing device is complex in that the individual press members each have to be actuated individually by hydraulic means.

Furthermore, reference is to be made, in connection with the prior art, to U.S. Pat. No. 2,211,008. An advantage of this known pressing device, which has three pressing jaws connected to one another to form a pressing chain, is that the pressing force is applied in a mechanically simple way, by a lever transmission. However, in this case too there is still a significant circumferential component in the movement of the press members during the pressing operation.

Working on the basis of the prior art cited in the introduction, the invention is based on the object of providing a pressing device having a plurality of pressing jaws, which combines a relatively simple structure with an optimally central approach of the press members during the pressing operation.

This object is achieved by the subject matter of claim 1 in which it is provided that at least two press members, in order to apply pressing force, are pivotably connected to one another via two pivot levers formed as angle levers, the angle levers being supported pressing on a first press member, and both angle levers being connected in tension to the same second press member. The angle levers supported pressing on the first press member enable the first press member to move centrally toward the longitudinal axis of the workpieces to be pressed during a pressing operation. As a result of the second pressing jaw being pulled by means of the angle levers, it is also possible for this second pressing jaw at the same time to be pulled centrally toward the longitudinal axis of the workpieces. There is practically no movement of the press members in the circumferential direction.

In a refinement, it is also provided that the angle levers are each connected, in the style of a toggle lever, to a pivot lever which transmits tensile force. In this respect, the angle lever can also be referred to as one of the two pivot levers of a toggle pivot, which is indeed predominantly addressed below.

The introduction of force into a pivot lever also preferably takes place outside an outer pivot. The pivots of the toggle-lever-like arrangement which are connected to a press member are outer pivots. As an expedient refinement, it is possible for the first and second press members to be disposed opposite one another with respect to the pressing cross section.

The press members being disposed opposite one another is in this context preferably to be understood as meaning that the ends of two press members are positioned mirror-symmetrically opposite one another with respect to a reference line running within the pressing cross-section plane. Furthermore, it is preferable for the two pairs, formed in this way, of ends, which are to face one another in the circumferential direction, of the first and second press members each to have an associated toggle lever, the ends of one pair in each case being connected to an outer pivot of the associated toggle lever. In this context, it is in particular also possible for the toggle levers to be disposed mirror-symmetrically with respect to a reference line which runs within a pressing cross-section plane and is perpendicular to the abovementioned axis of symmetry. This allows force to be introduced into the pressing device at two further locations, i.e. a total of four locations. Furthermore, depending on the number of press members, it is, of course, also possible to use a greater number of toggle levers, in which case it is possible, in terms of the way in which they are disposed, to employ various symmetries in order for force to be introduced as uniformly as possible.

In one expedient refinement, the toggle levers may for their part be movement-and/or force-coupled to one another so as to synchronize their movement sequences and/or to ensure an equal distribution of the introduction of forces, this coupling being effected, for example, by rigid or flexible transmission links, such as levers, pivot levers, tension cables or other expedient means. In principle, it is possible for ends of press members which are not connected by toggle levers to be connected, by single or double pivots, to a corresponding number of pivot bolts or, as is expanded upon below, to have displaceable guides.

With regard to the toggle lever or levers, it is furthermore preferable for the two pivot levers of a toggle lever to be of different lengths, so that the toggle lever is at a different distance from the press links connected to the toggle lever. In particular, the length of one pivot lever may be a multiple of, preferably double or triple, the length of the second pivot lever connected thereto.

If the two pivot levers are of unequal length, the advantageous situation may result, depending on the spacing of the outer pivots realized in the installed position at the pressing device, in the pressing position and if appropriate also even in an unstressed starting position of the pressing chain, in which a projection of the toggle pivot onto a straight line leading through the two outer pivots is located in the region of the outer pivot of the shorter pivot lever or even on the side which is remote from the other outer pivot.

In the event of force being introduced into the, for example, shorter pivot lever, leading to a reduction in the spacing of the outer pivots, given a stationary center point of the pressing cross section, the shorter pivot lever results in the abovementioned compressive action on the press member which adjoins it, with a tensioning action being exerted via the longer pivot lever on the press member which adjoins it, which actions include components directed oppositely to one another. Introduction of force into a pivot lever outside an outer pivot, depending the position of the force engagement location on the pivot lever and depending on the direction of the force which is acting from, for example, a clamping device of the pressing device, offers further fundamental advantages, i.e. irrespective of the length ratio of the two pivot levers. In a preferred variant, it is provided that the location where force is introduced be located away from a straight line through the toggle pivot and the outer pivot of the pivot lever which is subject to the force, and that the force introduced have a component in the direction of this straight line.

This means that the force introduced transmits a torque to the pivot lever, it being possible if necessary to step up or step down the movement or force transmitted to the ends, connected to the toggle lever, of the press members, depending on the outer pivot/location of force introduction and outer pivot/toggle pivot spacing ratio selected. In one expedient configuration, it is possible for an in relative terms shorter pivot lever of a toggle lever to have a force-introduction element positioned eccentrically with respect to the outer pivot of said toggle lever. The force-introduction element may, for example, be a bolt which is positively or nonpositively connected or cohesively joined to the pivot lever in the direction of movement of the latter. In particular in conjunction with the axially symmetrical positioning of two toggle levers as described above, consideration is preferably given to providing a force-introduction element at each of the mutually facing pivot lever ends of the two toggle levers.

Corresponding pivot levers or angle levers may, for example, be triangular in form, with the outer pivot, the toggle pivot and the force-introduction element being distributed in the corner regions of the triangle, the corner regions having the force-introduction elements determining the shortest distance between the shorter pivot levers of two toggle levers. As an alternative or in combination with this, it is possible for the outer pivots of these two pivot levers to be pivotably fitted in the region of the two opposite ends of the same press member, so that there is a constant distance between these outer pivots, Proceeding from a starting position, in which there is no or no significant introduction of force into the force-introduction elements, the pressing chain can exert pressure so as to reduce the pressing cross section by the distance between the force-introduction elements of the toggle levers being further reduced until if appropriate the pressing movement or reduction in cross section is restricted by a stop, optionally a reciprocal stop, of the pivot levers in question. The reduction in the spacing of the force-introduction elements may expediently be effected using a clamping device, as disclosed, for example, by WO 98/40178 or DE 10010601 A1, the content of disclosure of which is hereby incorporated in its entirety in the present application, partly with a view to incorporating features in claims of the present application. The force-introduction elements may for their part be matched, with regard to their cross section and if appropriate further dimensions, to a force engagement of a pincer-like pressing jaw of a clamping device.

A further expedient configuration involves a further or in each case a further press member being disposed in the circumferential-angle region of the in relative terms longer pivot of one or both toggle pivots. For this purpose, it is possible to provide for a further press member of this type to have the pivot levers engaging around it in a pressing cross-section plane. As an alternative or in combination, the press member may also have recesses for the pivot levers to penetrate through. According to a further preferred configuration, it is possible for two adjacent press members to have, at ends which face one another in the circumferential direction, projections and recesses which correspond in the circumferential direction and have mutually associated sliding surfaces running in the circumferential direction. According to this aspect, which is also of independent importance in the present application, the press members of the pressing chain are thereby guided with respect to one another. This opens up the possibility in particular of individual, adjacent press members not being pivotably connected to one another yet nevertheless producing by means of the sliding guides a predetermined relative movement between the press members connected in this way when force is introduced into the pressing chain in order to reduce the size of the pressing cross section. By way of example, press members with pressing jaws which are recessed in the circumferential direction with respect to the ends of the press members and press members with pressing jaws which project in the circumferential direction with respect to the ends of the press members may be disposed alternately in the circumferential direction. In a more specific embodiment, it is possible for a pressing jaw which projects in the circumferential direction to have an outer-wall section which runs in the circumferential direction and faces radially outward, and for an adjacent press member, starting from a pressing jaw which is recessed in the circumferential direction, to have an inner-wall section which runs in the circumferential direction and faces radially inward, and for the inner-wall section and the outer-wall section to extend at substantially the same radial distance from the center of the pressing cross section and, from a starting position to a closed or pressing position of the pressing chain, become covered to an increasing extent. In particular, sliding guidance of this type can be realized between all the adjacent press members of a pressing chain, so that in view of the coverage in the circumferential direction, the workpieces have a completely continuous coverage by the pressing chain over the entire circumference even before force is introduced. To position the device around the workpieces which are to be pressed together prior to a pressing operation, it is possible for the device to be opened, at virtually any desired pivot, by unscrewing the pivot bolt and to be closed again at the same location after the workpieces have been inserted. This means that in a device of this type, unlike with a pressing chain which is to be closed during a pressing operation, for example, there are no separately formed ends which constitute a possible weak point for the pressing operation.

Furthermore, it is possible for a press member, which is disposed in the circumferential-angle region of a pivot lever, to be secured captively to the pivot lever. If the press member penetrates through the pivot lever, this can be realized by the pivot lever entering a recess in the press member, which is completely surrounded within a pressing cross-sectional plane, by means of a projection, for example a pin. The size of the recess is such that the press member is not impeded during the pressing operation during the movement which is predetermined by the sliding guides.

One expedient configuration is also possible by virtue of a pressing jaw of a press member, in a cross section which is perpendicular with respect to the pressing cross section, having a semicircular recess which extends radially outward and is adjoined on one side by a pressure web which projects radially inward and is adjoined on the other side by locating pins which project radially inward. The locating pins may be formed as a plurality of cylindrical pins which are inserted into bores, extending radially from the pressing surface of the pressing jaw, in the pressing jaw. Whereas the recess, which is semicircular or at least comparable with regard to its cross section, is matched to a cross-sectional widening of the fitting for receiving a sealing element, for example an O ring, the locating pins are used to ensure that the pressing device can be closed in a predetermined orientation of the workpieces. If the workpieces are aligned correctly, it is then ensured that the radially inwardly projecting pressure web, during the pressing operation, leads to plastic deformation of overlapping regions of the workpieces which are to be pressed. Correctly positioned orientation of the workpieces is achieved by means of the locating pins, in that the latter are only supported against the cross-sectional widening of the pushed-on workpiece if the workpieces are oriented incorrectly, with the result that the pressing device, when it is placed onto the workpieces, cannot be reduced in size to the circumference required for insertion of a pivot bolt which has been removed. This is achieved, for example, by the workpiece which is pushed on, in the cross section perpendicular to the pressing cross section, having an asymmetrical bulge which enters the semicircular recess in the pressing jaw and the steeper flank of which does not form an obstacle to the locating pins, whereas the second, shallow flank of which leads to the said supporting of the locating pins. On the other hand, the pressing device can be fitted around the workpieces even when the latter are oriented incorrectly, but it cannot be closed. Even should one locating pin start to deteriorate in terms of its effect (spring) or become damaged (in particular in the case of a rigid design), the safety factor is not completely lost. It is also virtually impossible for any significant damage to be caused by any incorrect handling.

The invention is explained in more detail below with reference to the accompanying drawings, which merely illustrate exemplary embodiments and in which:

FIG. 19 shows a side view of the pressing device fitted around a pipe with a fitting slipped onto it and locating pins in accordance with a second embodiment, closure of the pressing device not possible;

FIG. 19*a* shows a cross section through the pressing device of FIG. 19;

FIG. 20 shows a side view of the pressing device corresponding to FIG. 19 but with the pipe with the fitting inserted the other way round, allowing closure of the pressing device;

FIG. 20 *a* shows a cross section through the pressing device of FIG. 20; and FIG. 21 shows a side view of the pressing device as shown in FIG. 20 after pressing has taken place;

FIG. 21*a* shows a cross section through the pressing device of FIG. 21.

Figure 1:
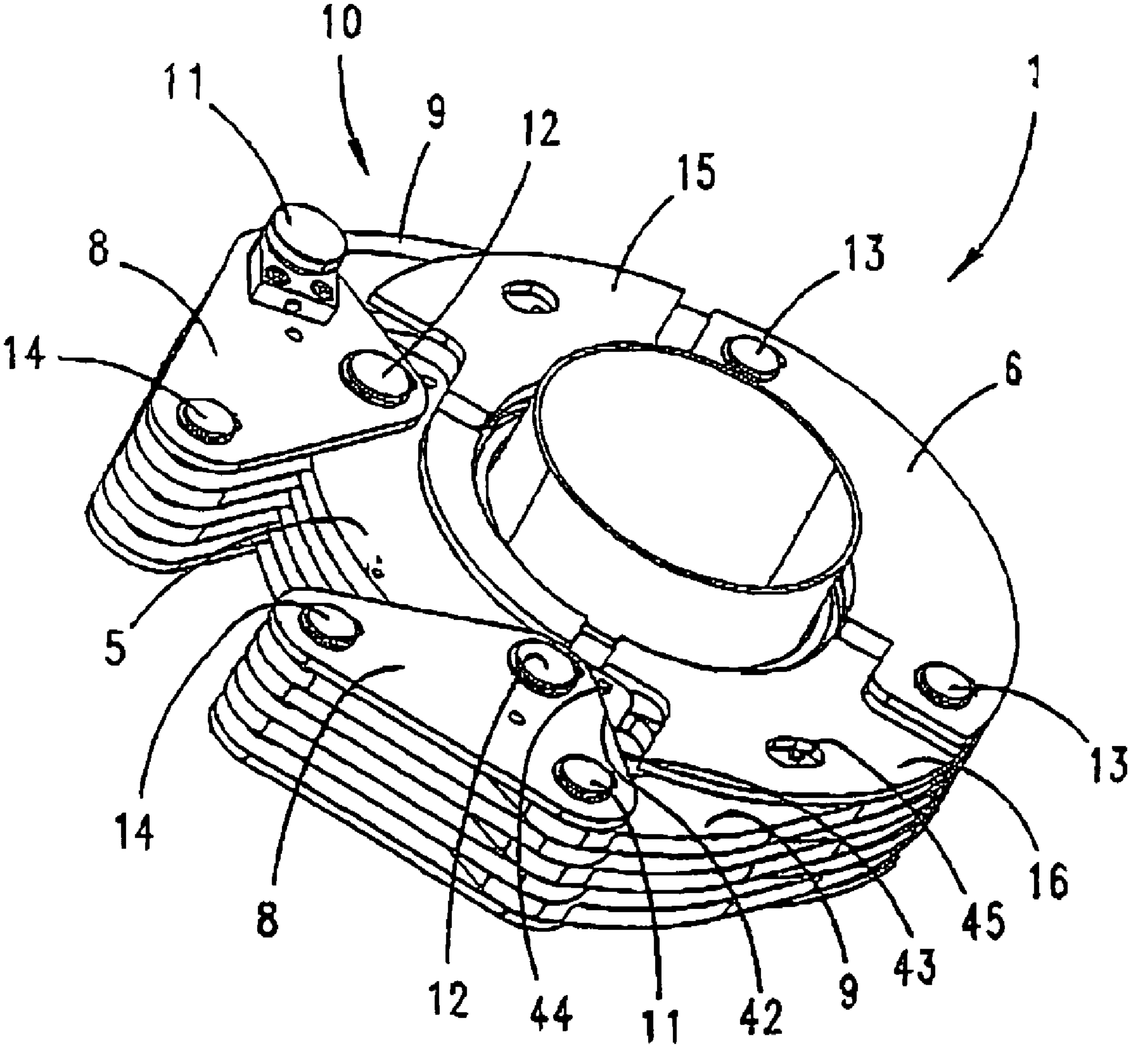
FIG. 1 shows a perspective view of a pressing device according to the invention with workpieces which are to be pressed together inserted therein.

FIG. 1 shows a perspective view of a preferred embodiment of the pressing device 1 according to the invention with tubular workpieces which are to be pressed together inserted in it. These workpieces, as can be seen in conjunction with the following figures, are a pipe 2 which has been inserted into a fitting 3.

The workpieces have a common central longitudinal axis A.

Figure 2:
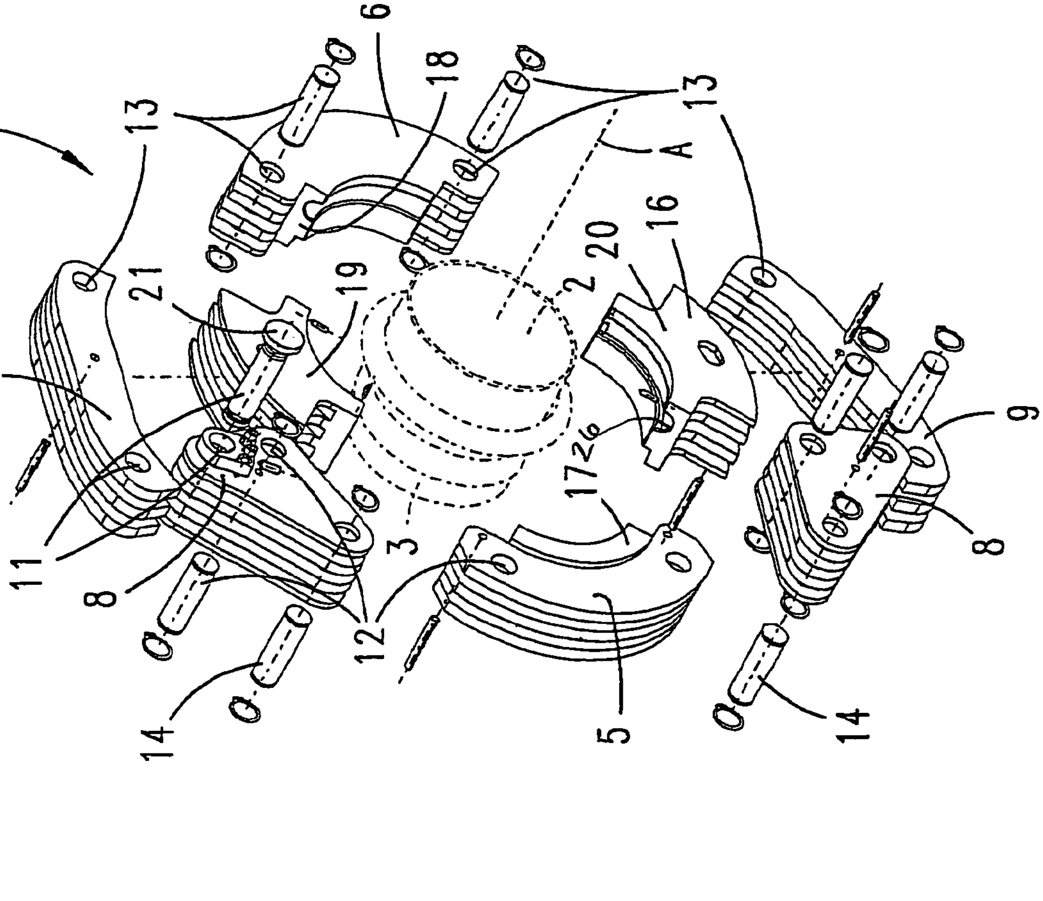
FIG. 2 shows a perspective, exploded view of the individual parts of the pressing device according to the invention.

As can be seen in conjunction with FIG. 2, the pressing device 1, in the exemplary embodiment shown, comprises four press members. In the context of the present invention, this means that a total of four press members interact in the operation of pressing of the workpieces, whereas—as explained further below—in the exemplary embodiment only two of the four press members are components which are connected by means of pivots which transmit tensile force.

The pressing device 1 has firstly two press members 5, 6 which lie opposite one another in the circumferential direction and, in order to change a pressing cross section 7 (cf. FIGS. 3, 4), can be displaced with respect to one another by means of two toggle levers 10 which each include a pivot lever 8 formed as an angle lever and a pivot lever 9. A pivot lever 8 is in each case connected to a pivot lever 9 by means of a toggle pivot 11. The pivot lever 8 has an outer pivot 12 which is connected to the press member 5.

At its opposite end, the pivot lever 9 has an outer pivot 13, which is connected to the press member 6. In view of the discernible axially symmetrical positioning of the two toggle levers 10, here and below identical reference symbols are selected for corresponding elements. In the respective circumferential-angle region of a pivot lever 9, which has a greater length than the pivot lever 8, there is in each case a further press member 15, 16, with the press members 15, 16 likewise lying opposite one another with respect to the pressing cross section.

The press members 5, 6 are not connected to the press members 15, 16 by means of pivots, but rather are merely held captively at the pivot levers 9 and, as explained in more detail below, guided by means of sliding guides on the press members 5, 6. This means that in the exemplary embodiment of the pressing device according to the invention described here, the press members surround the pressing cross section, or the workpieces to be pressed, uniformly over the entire circumference even before the pressing operation commences.

The uniform surrounding, in contrast to conventional pressing chains, does not have any end links, which constitute a possible weak point, and consequently there is accordingly also no interruption in any circumferential region to the surrounding by press members which are by contrast at a greater distance from one another.

Furthermore, according to the exemplary embodiment having the four press members 5, 6, 15, 16, what is formed is not a conventional chain in the sense of “link on link”. Instead, just two of the press members 5, 6 involved in the pressing operation carried out by the device 1 are pivotably integrated into the device 1 by means of force-transmission elements 14 connected between them. Furthermore, in the exemplary embodiment described, the pressing cross section 7 is formed by circumferentially alternating integrated press members 5, 6 and elements 15, 16 connected between them.

The two press members 15, 16 which are provided as elements connected in between, which are also referred to as auxiliary members, are merely held captively at the force-transmission elements 14, in the present case the toggle levers 10, with additional guidance being made possible by means of bearing surfaces on the respectively adjacent integrated press members 5, 6. The integrated press members 5, 6 are disposed so as to surround the auxiliary members 15, 16 in a positively locking manner—by means of the bearing surfaces—in such a manner that the auxiliary members 15, 16, during a pressing operation, are prevented from yielding radially outward relative to the integrated press members 5, 6.

Whereas in the case of conventional pressing chains respectively adjacent press members are all connected, either directly or if appropriate by simple connecting elements, in such a manner that a tensile three is passed through all the press members in the circumferential direction, and consequently the pressing chain fails completely in the event of problems with any single press member, this is advantageously avoided in the exemplary embodiment described for the press members 15, 16 which are merely held captively. Accordingly, in the pressing device 1 there is no need for any circumferential pivot force transmitted in each case between circumferentially adjacent links, but rather a radially oriented introduction of force can be effected, by means of the toggle levers 10, at the two press members 5, 6 which are integrated in the manner of a chain and are spaced apart at the circumference, from where the pressing force introduced is transmitted, via the bearing surfaces described above, to adjacent press members 15, 16 which are not integrated in the pressing chain, predominantly as compressive and shear force.

Furthermore, force-introduction elements 14 for introducing force outside the outer pivot 12 are provided at the pivot levers 8. In the exemplary embodiment shown, the press members 6, 15 and 16 and the pivot levers 8 each have four plate regions which are spaced apart from and parallel to one another, with parallel gaps located between them. By contrast, the press member 5 and the pivot levers 9 each have three comparable spaced-apart plate regions, which are dimensioned and spaced apart in such a manner that they can engage in the gaps in the press members 6, 15, 16 and the pivot lever 8, so that mutual penetration of the links is enabled. With regard to the press members 5, 6, 15 and 16, the plate regions are integrally connected to one another via pressing jaws 17, 18, 19, 20, resulting in a stable configuration. At the same time, there are production advantages, in that the press members 6, 15 and 16 are obtained with equal dimensions and spacing of plate regions by cutting from a common semifinished product.

The pivot connections between the press members 5, 6 and the pivot levers 8, 9 explained above are made through end bores which penetrate through one another in the assembled state and through which the cylindrical pins are fitted and held at their ends by securing rings. In the exemplary embodiment shown, it is provided that the pressing chain can be opened at the toggle pivot 11 of the upper toggle lever 10 by a coupling bolt 21 being removable. However, this is not an imperative choice, but rather as an alternative it would also be possible for the pressing chain to be opened by removal of, for example, a pivot bolt at one of the outer pivots 12 and closed again after insertion of the workpieces 2, 3 to be pressed together.

Figure 3:
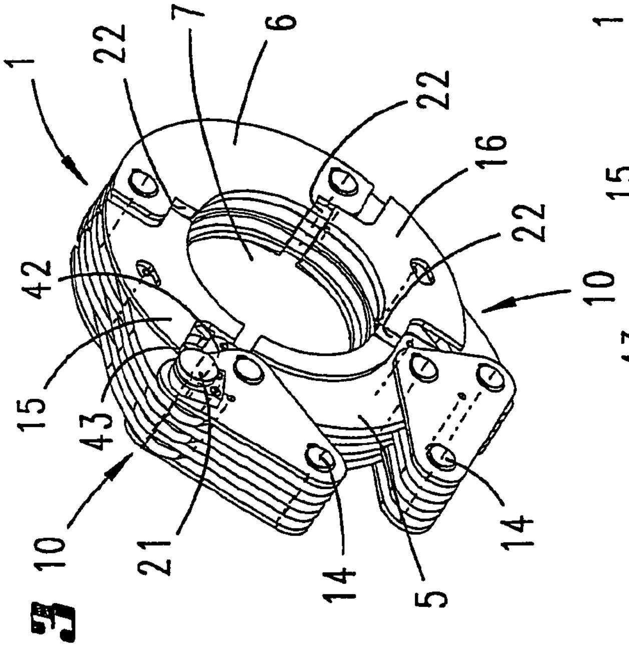
FIG. 3 shows a perspective view of the pressing device shown in FIG. 1 in an open position without workpieces.
Figure 4:
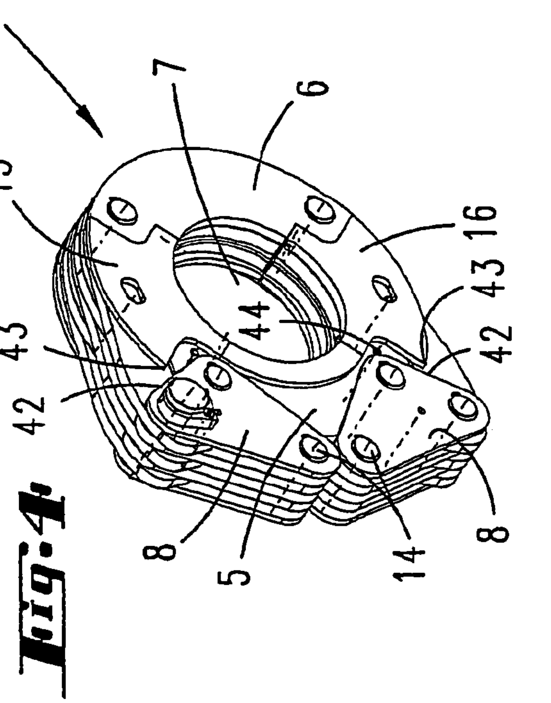
FIG. 4 shows a perspective view of the pressing device shown in FIG. 1 in a pressing position without workpieces.

It is clear from FIG. 3 that as soon as the coupling bolt 21 has been inserted, and before the actual pressing operation commences, the pressing cross section 7 is completely encircled by press members 5, 6, 15 and 16. It can also be seen that during a pressing operation, during which the distance between the force-introduction elements 14 is reduced, the force introduced is introduced via the toggle levers 10 at four locations distributed over the circumference of the pressing cross section 7, namely the outer pivots 12 and 13, which are in each case present in pairs. Prior to the pressing operation, spaces 22 between the pressing jaws 18 and 19, 19 and 17, 17 and 20, 20 and 18, the delimiting walls of which come to bear against one another in the pressing position illustrated in FIG. 4, are in each case left between the press members 5, 6, 15 and 16. The pressing position is in this case simultaneously defined by a stop for the pivot levers 8 in their corner regions produced by means of the force-introduction elements 14.

Figure 5:
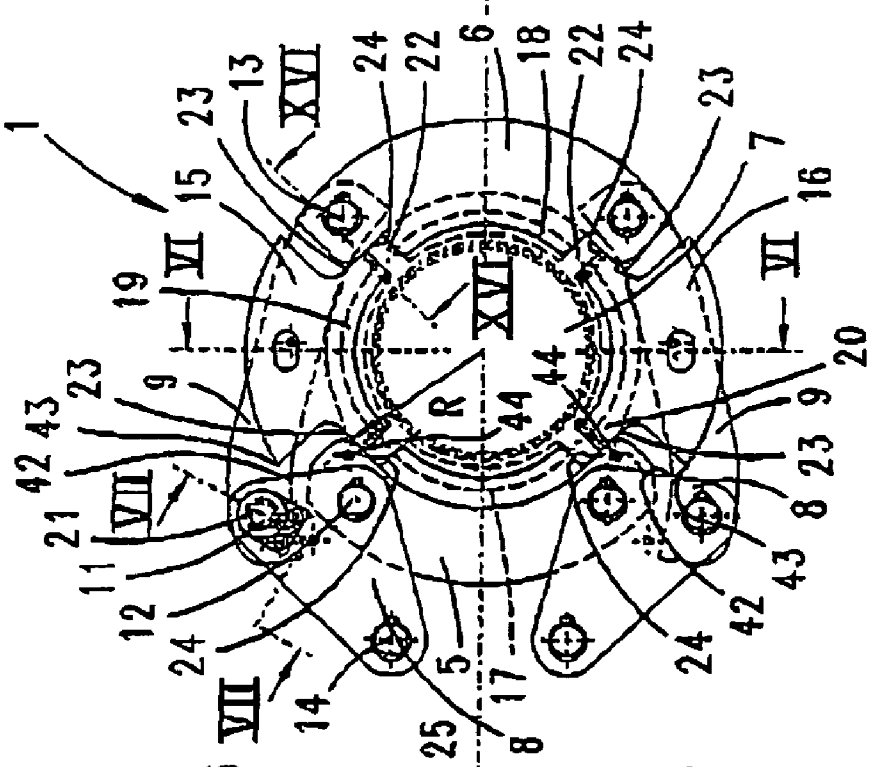
FIG. 5 shows a side view of the pressing device shown in FIG. 1 in an open position with workpieces which are to be pressed.

FIG. 5 shows a side view of the embodiment of the pressing device 1 according to the invention illustrated in FIGS. 1 to 4 in the position corresponding to FIG. 3 with the pressing device 1 closed prior to commencement of the pressing operation. This figure once again reveals that the length of the pivot lever 8, i.e. the distance between the toggle pivot 11 and the outer pivot 12, is selected to be shorter than the distance of the pivot lever 9, i.e. the distance between the toggle pivot 11 and the outer pivot 13. It is also clear from this figure that the press members 5, 6 are configured with pressing jaws 17, 18 which are recessed in the circumferential direction with respect to their ends, and the press members 15, 16 are configured with pressing jaws 19, 20 which project in the circumferential direction with respect to their ends.

The pressing jaws 19, 20 which project in the circumferential direction have a wall section 23 which runs in the circumferential direction and faces radially outward. By contrast, the adjacent press members 5, 6, starting from a pressing jaw 17, 18 which is recessed in the circumferential direction, have an inner-wall section 24 which runs in the circumferential direction and faces radially inward, the inner-wall sections and the outer-wall sections extending at the same radial distance R from the center of the pressing cross section 7 and become covered to an increasing extent from the starting position illustrated in FIG. 5 to the pressing or closed position which is shown by way of comparison in FIG. 9.

These wall sections 23, 24, which are in compressive engagement with one another during pressing, produce a positive lock in the radial direction. As a result, pressing force is transmitted from the first and/or second press member 5, 6 to a further press member 15, 16.

Furthermore, two means, which can be realized as alternatives or in combination with one another, for limiting the rotation of the pivot levers 8 are also provided in FIG. 5. The rotation limiting is in each case formed by a stop, which becomes active at a limit rotation angle, for an edge 42 of the pivot levers. One stop is in this case formed as an edge 43 of the press member 15 or 16, which the edge 42 butts against at a preselected opening angle of the pivot levers 8. In the variant, the stop is in each case formed by an end 44 of a pin, which protrudes beyond the press member 5, see FIG. 13, of a pin, in which case a stop is reached against the edge 42 likewise at a predetermined opening angle. The rotary limiting means described above may preferably be formed or disposed in such a way that it is only possible to reach a maximum opening angle of the pivot levers 8 at which the guide surfaces of the inner-wall sections and outer-wall sections, when the pressing chain is closed, still remain with a circumferential coverage with respect to one another, so that in any possible opening position of the pivot levers 8 unlimited rotation of the press members 15, 16 about the captive securing feature is prevented.

In detail, the captive securing feature comprises a peg 44 (cf. in particular FIGS. 14, 15), which is disposed on a pivot lever 9. The peg 44—there are advantageously two pegs 44 formed opposite one another on a pivot lever 9—projects into a recess 45 in a further press member 15, 16 . At the same time, the recess 45 limits the movability of the further pressing link 15, 16 relative to the pivot lever 9 (with the movability also being limited by the positively locking engagement with respect to the first or second pressing link 5, 6).

Figure 6:
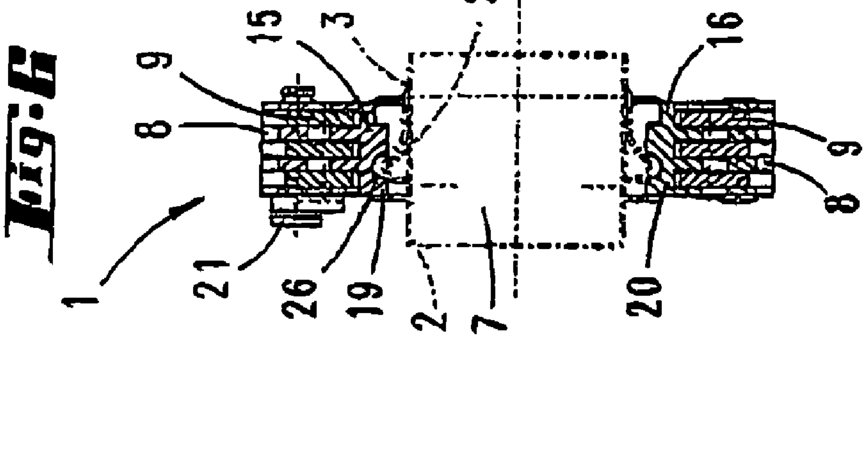
FIG. 6 shows a sectional view on section line VI-VI in FIG. 5.

FIG. 6 shows a sectional view through the pressing device 1 on section line VI-VI in FIG. 5. It is clear from this figure that a pipe 2 and a fitting 3 which has been pushed over it have been inserted into the pressing cross section 7 as workpieces. The fitting 3 has a radial bulge 25 running in the circumferential direction, which in terms of its position is associated with a semicircular recess 26 which faces radially outward and likewise extends over the circumference in the pressing jaws 19, 20.

Figure 7:
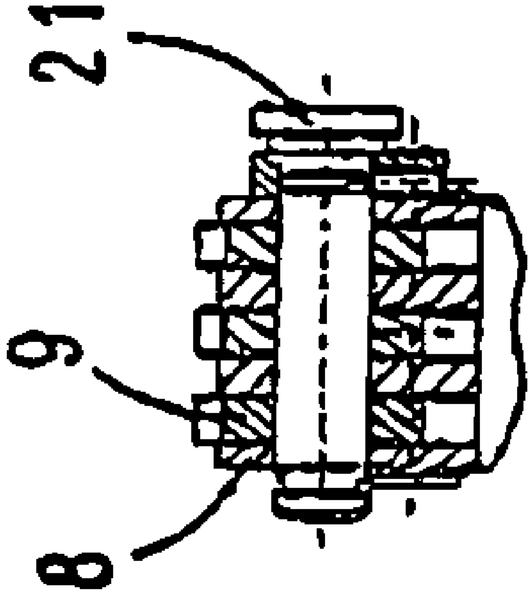
FIG. 7 shows a sectional view on section line VII-VII in FIG. 5 with inserted closure bolt.

FIG. 7 shows a sectional view on section line VII-VII in FIG. 5, with the coupling bolt 21 inserted into bores within the pivot levers 8 and 9 in order to close the toggle joint 11. In this position, the coupling bolt 21 can also be fixed in place by a securing disk (not shown in the drawing) at the narrowed end.

Figure 9:
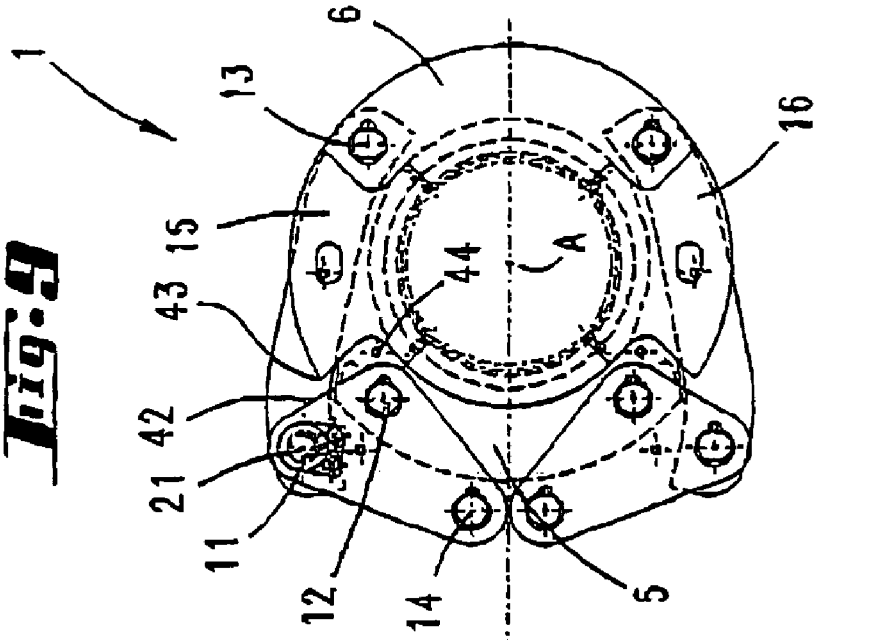
FIG. 9 shows a side view of the pressing device shown in FIG. 1 in the pressing position with workpieces to be pressed.

FIG. 9 shows a pressing position, in which the press members 5, 6, 15, 16 have been moved radially inward toward the longitudinal axis A of the workpieces 2, 3.

Figure 8:
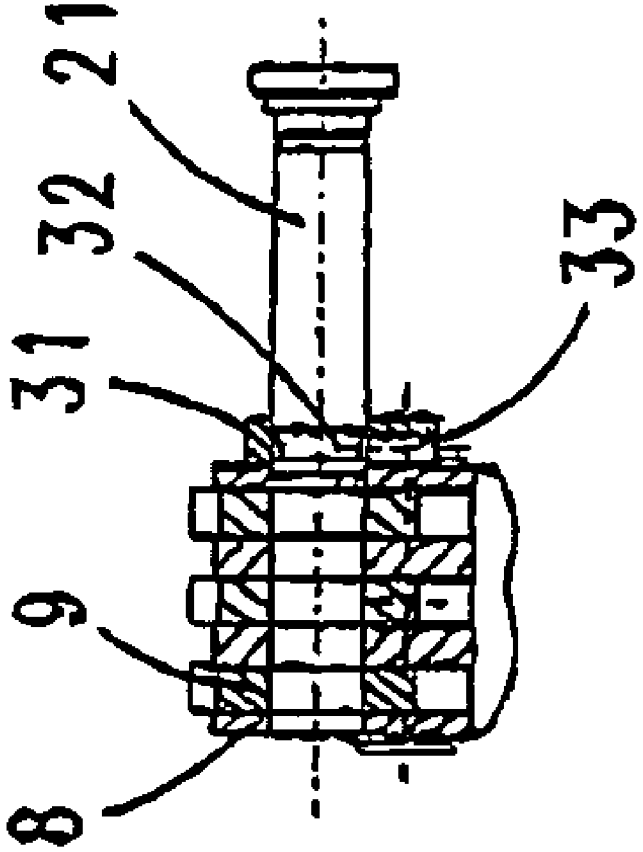
FIG. 8 shows a sectional view with the closure bolt disengaged compared to FIG. 7.

FIG. 8, by contrast, shows a section in which the coupling bolt 21 has already been virtually completely pulled out of the bores for opening purposes. In this case, however, the coupling bolt 21 still intentionally projects into a holding plate 31 sufficiently for a holding element 33 to enter an annular groove 32, so as to form a captive securing feature. The holding element 33 may, for example, be a grub screw, a cylindrical pin pressed resiliently against the annular groove or the like.

Figure 11:
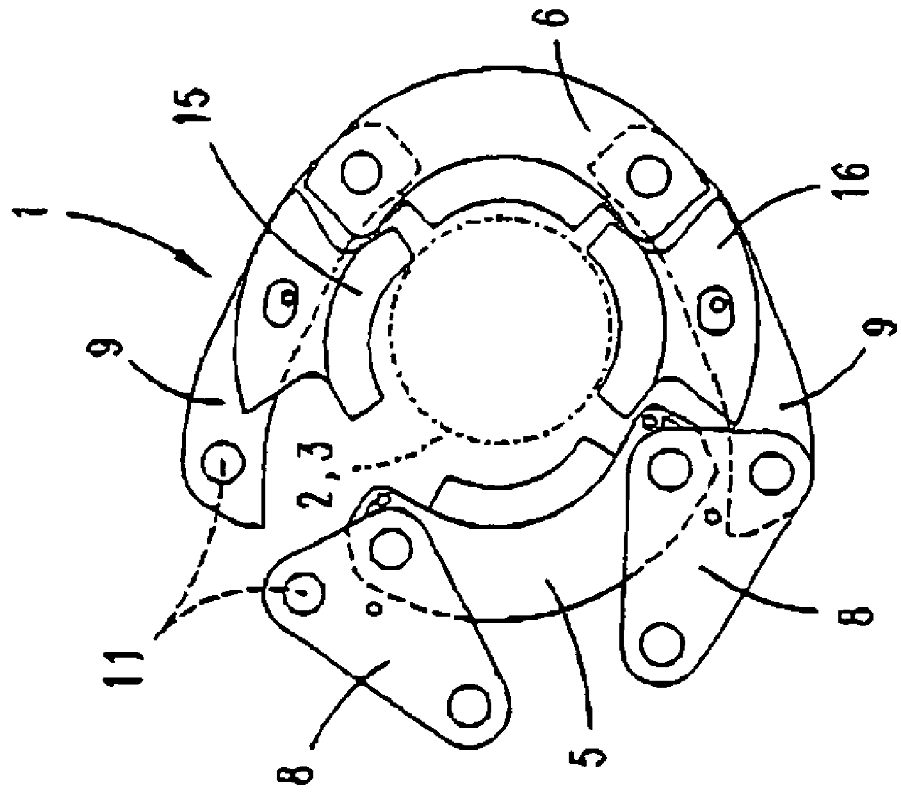
FIG. 11 shows a side view of the pressing device according to the invention with the device open but already fitted around the workpieces to be pressed.
Figure 10:
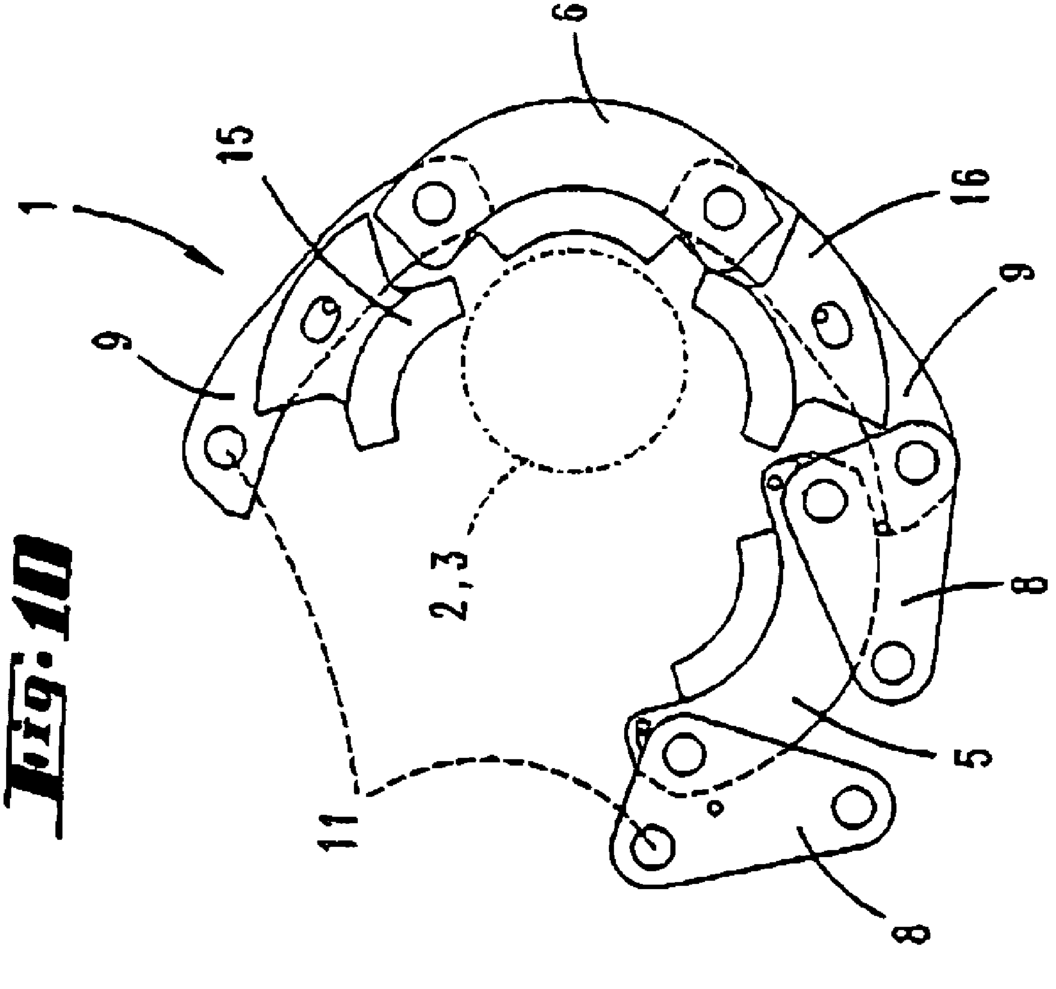
FIG. 10 shows a simplified side view of the pressing device according to the invention with the device open.
Figure 12:
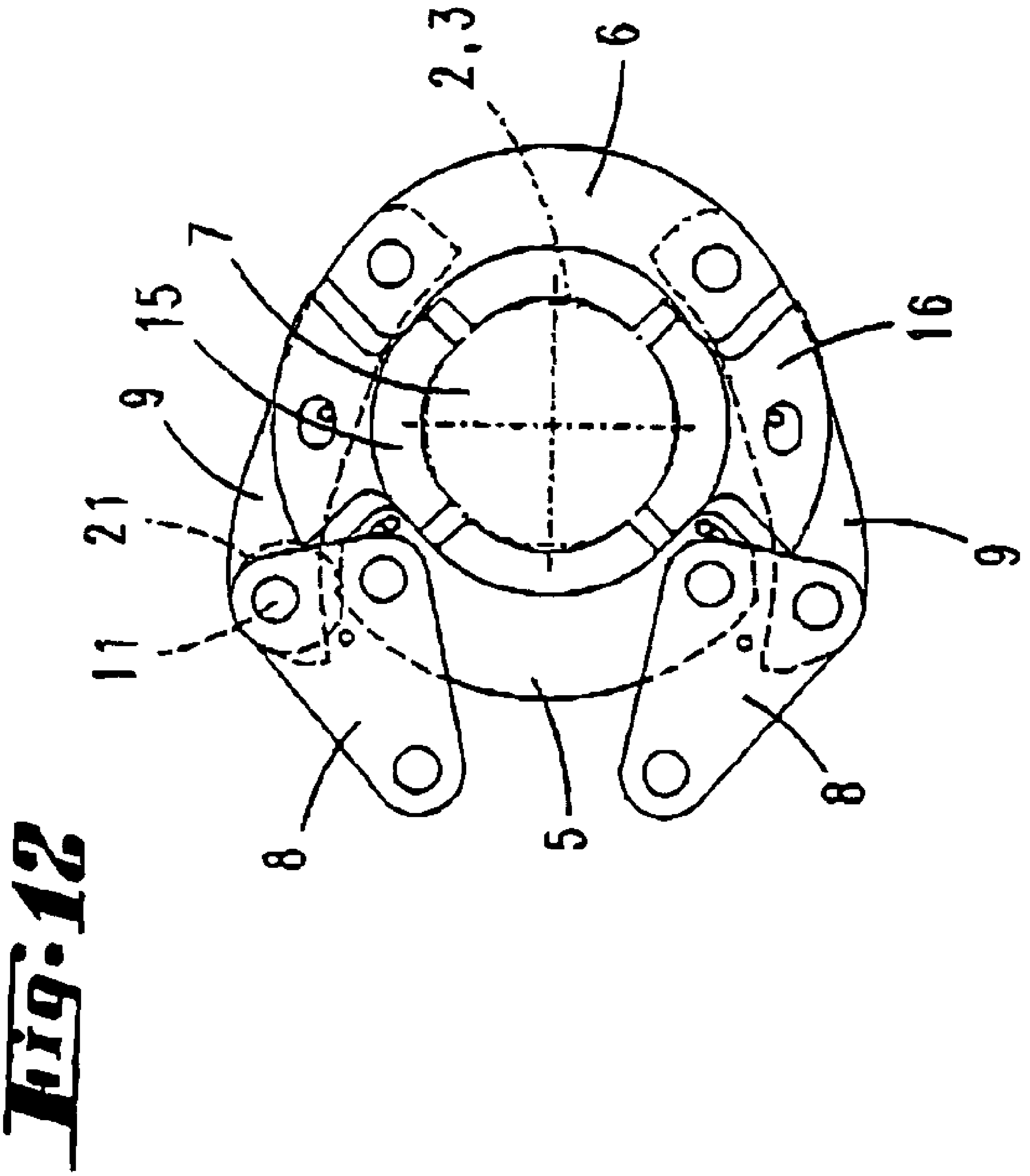
FIG. 12 shows a side view of the pressing device, in the fully locked position, but before a pressing operation commences.

FIGS. 10 to 12 show the successive movement sequence involved in closing the pressing device 1, with a simplified illustration compared to the previous figures having been selected. FIG. 10 in this respect describes a position which is open at the toggle pivot 11, so that ends formed in this way are pulled apart for insertion or enclosing of the workpieces 2, 3.

FIG. 11 shows a further state which is passed through during the closure movement of the device 1, shortly before the pivot levers 8 and 9 have been pivoted into the overlapping position which is required for insertion of the coupling bolt 21.

FIG. 12 shows the device 1 in the required overlap, in which the coupling bolt 21 is to be inserted on account of the overlapping bores.

Figure 13:
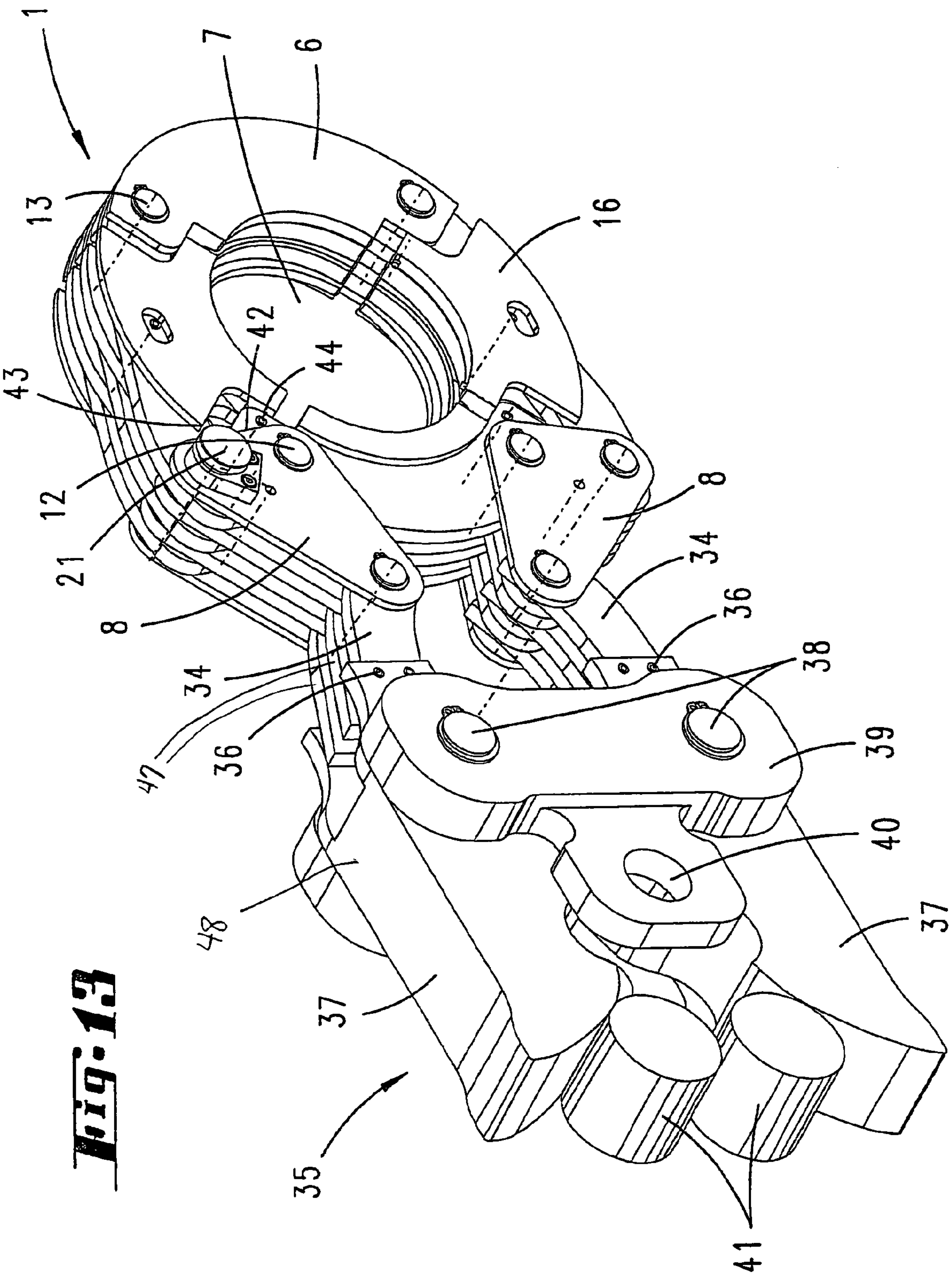
FIG. 13 shows a perspective view of the pressing device according to the invention in conjunction with pressing jaws of a clamping device.

FIG. 13 shows a perspective view of the pressing device 1 according to the invention, which is also illustrated in the preceding figures, in conjunction with pincer-like pressing jaws 34 and a clamping device 35. The pressing jaws 34 are connected in a rotationally fixed manner to in each case a lever 37 by bolts 36, the levers 37 being accommodated rotatably by pins 38 in two parallel straps 39. The straps 39 have bores 40 for positionally fixed securing to the clamping device 35, which is not otherwise illustrated in the drawing. During a pressing operation, the sliding bodies 41 illustrated are pressed toward the fixed point at the bore 40 by a pressure ram of the clamping device 35, and consequently, on account of the shaping of the lever inner walls, the levers 37 are spread apart. This causes the distance between the pressing jaws 34 on the opposite side from the pins 38 to be reduced. These pressing jaws 34 are connected to the pivot levers 8 in a positively locking manner by means of the force-introduction elements 14. During a pressing operation, therefore, the distance between force-introduction elements 14 is reduced, which leads, via rotation of the pivot levers or angle levers 8 and 9, to the reduction in the pressing cross section 7 described above.

Advantageous predetermining of the position of the further press members 15, 16 in the assembly of the pressing device 1 is explained with reference to FIGS. 14 and 15.

Figure 14:
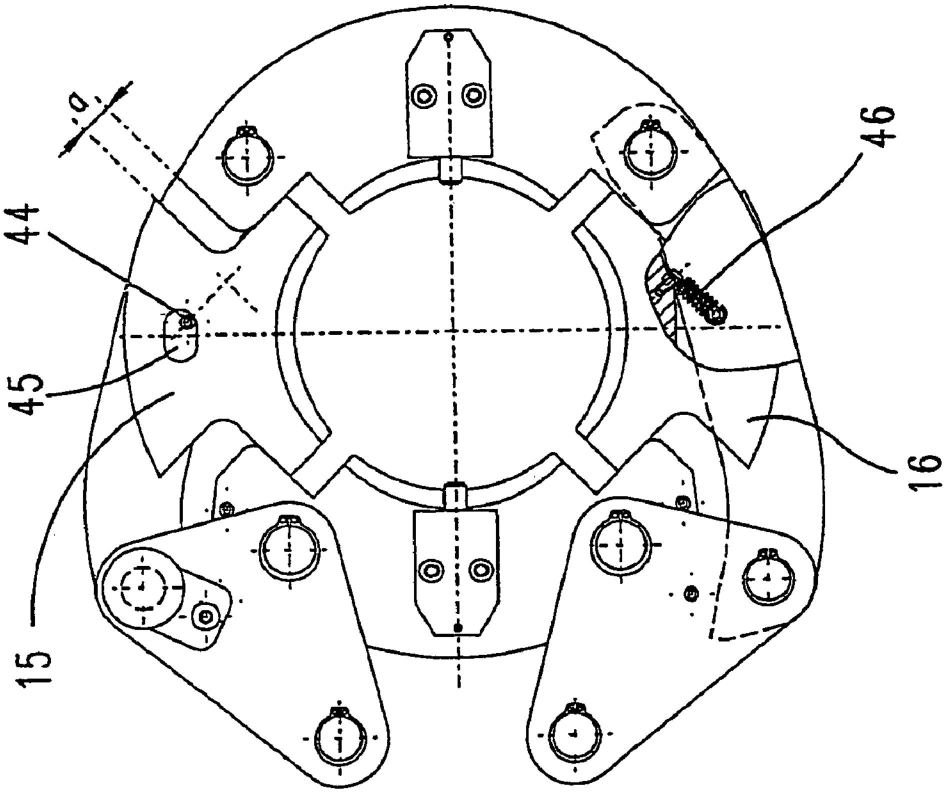
FIG. 14 shows a pressing device as shown in FIG. 1, but with the position of a further press member (auxiliary press member) predetermined by means of a spring.
Figure 15:
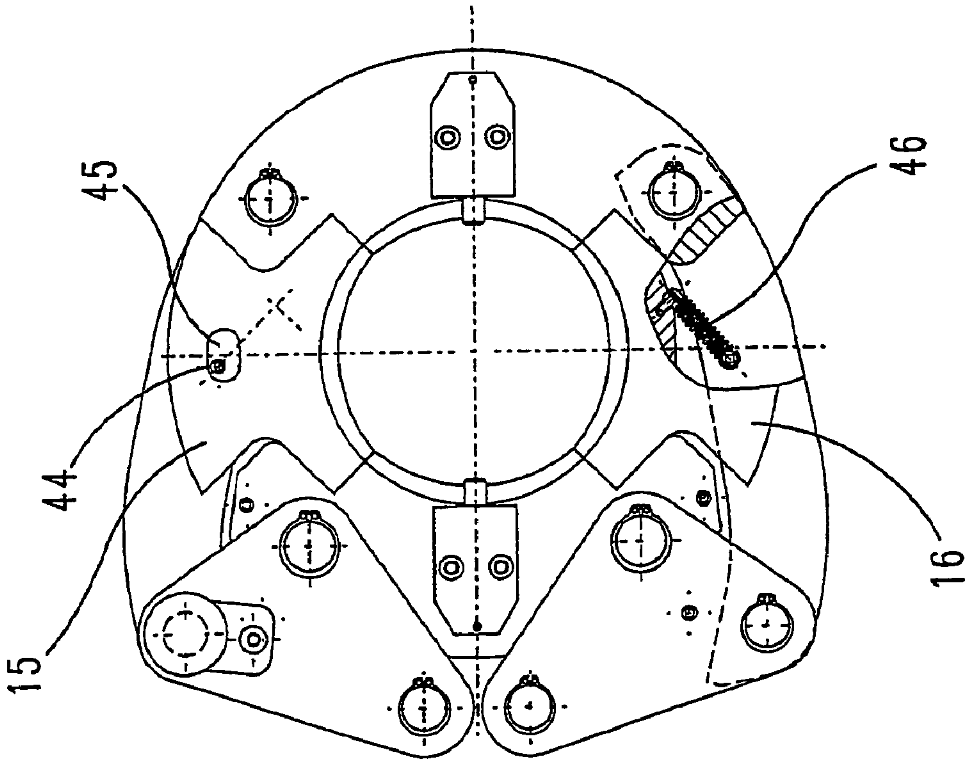
FIG. 15 shows the pressing device shown in FIG. 14 in the pressing state.

A further press member 15, 16 is preloaded into a circumferentially spaced position, cf. distance a in FIG. 14, with respect to a first or second press member 5, 6. The preloading is realized by means of spring elements 46 (FIGS. 14 and 15 in each case illustrate just one spring element 46; however, it will be understood that both further press members 15, 16 are each connected to a pivot lever 9 by means of at least one spring element 46). The preloading is limited by a positive lock with respect to the pivot lever 9, as explained in more detail below. In this case, the limiting is provided in such a way that the circumferential spacing a with respect to the first or second press member 5, 6 is in each case identical.

During the pressing operation, this circumferential section 7 is reduced in size as a result of all the pressing jaws 5, 6, 15, 16 moving centrally inward, not as a result of the pressing jaws moving 5, 6, 15, 16 circumferentially.

The positively locking movement restriction is achieved by virtue of the peg 44 bearing against a circumferential edge of the recess 45, as illustrated in FIG. 14, in the starting state. Furthermore, the recess 45 is selected in such a way that, after pressing, the peg 44, with a diagonal path through the slot-like recess 45, is located at a diagonally opposite edge section of the recess 45.

A further subject of the invention, which is of significance on its own or in combination with the features described above, is a pressing jaw 34 for a pressing device 1, see FIG. 13, as described in detail here. In this context, it is significant that the pressing jaw 34 is formed by jaw elements 47 which are disposed covering and spaced apart from one another, cf. for example FIG. 13. At their free ends (with respect to the securing state at the pressing device 1, prior to connection to a pressing chain), the jaw elements 47 have through-bores which are aligned with one another.

The jaw elements 47 are formed as flat parts. At their other end, which is connected to the clamping device 35, they arc connected to a solid jaw foot 48, specifically by means of the abovementioned bolts 36. The jaw root 48, which is to this extent U-shaped in form, engages around the jaw elements 47.

Furthermore, the thickness of the jaw elements 47 is matched to the engagement distance between plate parts of the pivot levers 8.

Figure 16:
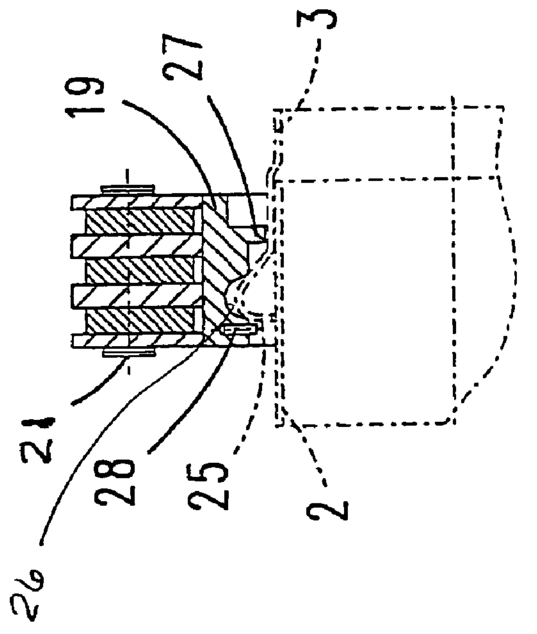
FIG. 16 shows a sectional view on XVI-XVI in FIG. 5 with the workpieces oriented correctly.

FIG. 16 shows a sectional view on section line XVI-XVI in FIG. 5, but unlike in FIG. 6 projecting locating pins 28 are additionally provided on the radially inner wall of the pressing jaw 19. In the exemplary embodiment shown, there are four locating pins 28 which are distributed at equal spacings over the circumference and are inserted into blind bores extending radially starting from the inner wall of the pressing jaws. FIG. 16 shows a correctly positioned, i.e. desired orientation of the workpieces 2, 3 in the pressing device 1, in which the bulge 25, which is asymmetrical in the plane of the drawing, is positioned with a steep flank to the side of the locating pin 28.

Figure 17:
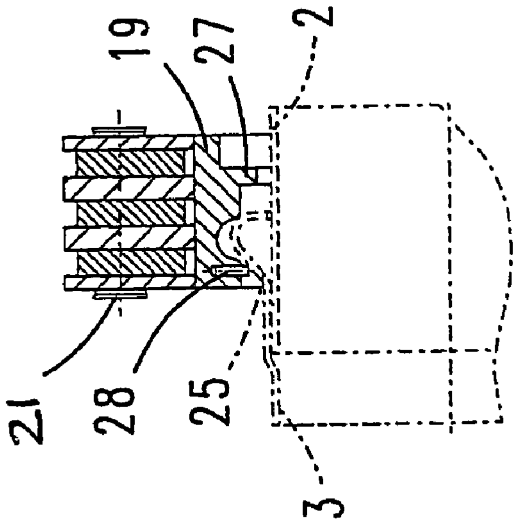
FIG. 17 shows a sectional view according to FIG. 16 with the workpieces oriented incorrectly.

FIG. 17, by contrast, shows the opposite orientation of the workpieces 2, 3, in which the locating pin 28, when the pressing device 1 is closed, comes to bear against a shallow flank of the bulge 25 before the pressing device 1 can be completely closed (cf. FIG. 12, 19). The correct positioning of the workpieces 2, 3 ensures that the pressure web 27 is located in the region of a workpiece overlap in the region of which plastic deformation is to occur. By contrast, plastic deformation on the opposite side of the bulge 25 would be undesirable, since this would jeopardize secure engagement of a sealing ring which can be accommodated inside the bulge 25 but is not shown in the drawing.

Figure 18:
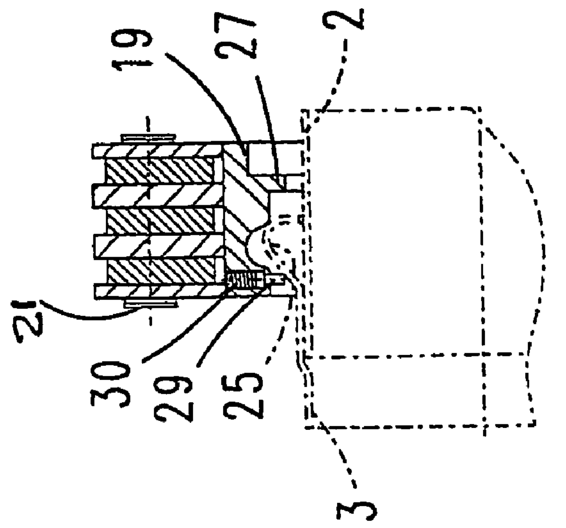
FIG. 18 shows a sectional view with modified locating pins compared to FIG. 16.

FIG. 18 shows a configuration of the locating pins 28 which is modified with respect to FIG. 16 and in which a pressure pin 29 is preloaded by a compression spring 30 in such a manner that the pressing chain, with the undesired orientation of the workpieces 2, 3 illustrated, likewise cannot be closed. As an alternative to this embodiment of the locating pins 28, this embodiment may also have threaded pins which can be adjusted as required in a radially extending bore by means of a threaded nut.

The embodiment shown in FIG. 19-21*a* uses locating pins 28 which are also spring-mounted against a compression spring 30, in a manner corresponding to FIG. 18.

Whereas in the first embodiment the locating pins 28 are disposed so close to the recess 26 in the press jaw that if utilized incorrectly (FIG. 17, 18) they strike the inclined surface of the fitting, in the embodiment shown in FIG. 19-21 the locating pins 28 are disposed outside the pressing jaw and therefore at a distance from the recess 26 which is such that in the event of incorrect use they merely come into contact with the horizontal section of the fitting 2. Nevertheless, the pressing device 1 described here cannot be closed if it is used incorrectly, as above (FIG. 20).

The locating pins 28 are accommodated in a holder 44" fitted onto the outer side of the pressing jaws 17, 18.

A locating pin 28 is preloaded in its extended. position, as illustrated in FIGS. 19*a* and 20*a*, by the spring 30.

The preloading is so great that it cannot be overcome by normal manual force during fitting. It is, for example, 200 N per locating pin.

The spring preloading, which is subsequently overcome by the pressing force used during the pressing, at the same time also means that the unaffected pipe 2 also cannot be damaged. Accordingly, it is selected in such a way that it does not leave behind any or any significant imprint of pressing in the pipe 2.

This spring preloading is correspondingly important by virtue of the fact that the locating pins 28 can be disposed at the said distance from the recess 26, and therefore protrude a corresponding distance onto the pipe 2, but at the same time cannot cause any damage during the pressing operation.

All features disclosed are (inherently) pertinent to the invention. The disclosure content of the associated/appended priority documents (copy of the prior application) is hereby incorporated in its entirety in the disclosure of the application, partly with a view to incorporating features of these documents in claims of the present application.

The invention claimed is:

1. A pressing device for the press-joining of tubular workpieces including, a tube, on the one hand, and a fitting slipped onto the tube, with plastic deformation of at least one of the workpieces, the pressing device comprising:

first and second press members having first and second ends;

first and second pivot members which are connected to one another by a first connection mechanism, said first pivot member being connected to said first press member proximate to said first end thereof by a second connection mechanism, said second pivot member being connected to said second press member proximate to said first end thereof by a third connection mechanism;

third and fourth pivot members which are connected to one another by a fourth connection mechanism, said third pivot member being connected to said first press member proximate to said second end thereof by a fifth connection mechanism, said fourth pivot member being connected to said second press member proximate to said second end thereof by a sixth connection mechanism; and first and second auxiliary press members, said first auxiliary press member being secured to said second pivot member, said second auxiliary press member being secured to said fourth pivot member, wherein during a pressing operation, each of said first and second press members and each of said first and second auxiliary press members move radially toward a central longitudinal axis of the workpieces in order to carry out the pressing of the workpieces.

2. The pressing device as defined in claim 1, wherein said first and second press members are disposed opposite one another with respect to a pressing cross-section of the workpieces, and wherein said first and second auxiliary press members are disposed opposite one another with respect to the pressing cross-section of the workpieces.

3. The pressing device as defined in claim 1, wherein each of said first and second press members, said first, second, third and fourth pivot members, and said first and second auxiliary press members have outer edges, and wherein each of said first and second press members, said first, second, third and fourth pivot members, and said first and second auxiliary press members are formed to have projections and recesses formed in an alternating manner along their respective outer edges, said projections configured to interengage said recesses such that members will bear against one another.

4. The pressing device as defined in claim 3, wherein at least one of said projections of said first pivot member bears against at least one of said projections of said first press member proximate to said first end thereof, and wherein at least one of said projections of said third pivot member bears against at least one of said projections of said first press member proximate to said second end thereof.

5. The pressing device as defined in claim 3, wherein at least one of said projections of said second pivot member bears against at least one of said projections of said second press member proximate to said first end thereof, and wherein at least one of said projections of said fourth pivot member bears against at least one of said projections of said second press member proximate to said second end thereof.

6. The pressing device as defined in claim 3, wherein at least one of said projections of said first pivot member bears against at least one of said projections of said first auxiliary press member, and wherein at least one of said projections of said third pivot member bears against at least one of said projections of said second auxiliary press member.

7. The pressing device as defined in claim 3, wherein said first and second press members and said first, second, third and fourth pivot members surround said first and second auxiliary press members in a positively locking member, whereby during a pressing operation, said first and second auxiliary press members are prevented from yielding radially outward relative to said first and second press members.

8. The pressing device as defined in claim 1, wherein each of said second and fourth pivot members transmit a tensile force.

9. The pressing device as defined in claim 1, wherein said first and second press members are disposed opposite one another with respect to a pressing cross-section.

10. The pressing device as defined in claim 1, wherein said first pivot member is shorter in length than said second pivot member, and wherein said third pivot member is shorter in length than said fourth pivot member.

11. The pressing device as defined in claim 10, wherein said first pivot member has a force-induction element positioned eccentrically with respect to said second connection mechanism, and wherein said third pivot member has a force-induction element positioned eccentrically with respect to said fifth connection mechanism.

12. The pressing device as defined in claim 11, wherein said force-induction elements of said first and third pivot members are matched, with regard to their cross-sections, to force engagements of pincer-like jaws of a clamping device.

13. The pressing device as defined in claim 10, wherein said second pivot member defines a circumferential-angle region in which said first auxiliary press member is disposed, and wherein said fourth pivot member defines a circumferential-angle region in which said second auxiliary press member is disposed.

14. The pressing device as defined in claim 1, wherein said first and second press members and said first and second auxiliary press members each have projections and recesses which correspond in a circumferential direction and have mutually associated sliding surfaces running in said circumferential direction.

15. The pressing device as defined in claim 1, wherein said first and second press members further include pressing jaws which are recessed in the circumferential direction with respect to the ends of the first and second press members, and wherein said first and second auxiliary press members further include pressing jaws which project in the circumferential direction with respect to the ends of the first and second auxiliary press members, said pressing jaws of said first and second press members and said pressing jaws of said first and second auxiliary press members being disposed alternately in the circumferential direction.

16. The pressing device as defined in claim 15, wherein said pressing jaws of said first and second auxiliary press members have outer-wall sections which run in the circumferential direction and face radially outward, and wherein said first and second press members have inner-wall sections which run in the circumferential direction and face radially inward, wherein the inner-wall sections and the outer-wall sections extend at substantially the same radial distance from a center of the pressing cross-section and, wherein said inner-wall sections become covered to an increasing extent from a starting position to a closed position of the pressing device.

17. The pressing device as defined in claim 15, wherein at least one of said first and second press members, in a cross-section which is perpendicular with respect to the pressing cross-section, has a semi-circular recess which extends radially outward and is adjoined on one side by a pressure web which projects inward and is adjoined on the other side by locating pins which project radially inward.

18. The pressing device as defined in claim 17, wherein the plurality of locating pins are inserted into radially extending bores in said at least one of said first and second press members.

19. The pressing device as defined in claim 17, wherein each locating pin is received in a holder fitted onto the outer side of said at least one of said first and second press members.

20. The pressing device as defined in claim 17, wherein each locating pin can be retracted counter to spring force.

21. The pressing device as defined in claim 17, wherein each locating pin is preloaded in its extended position.

22. The pressing device as defined in claim 1, wherein said first auxiliary press member is captively secured to said second pivot member, and wherein said second auxiliary press member is captively secured to said fourth pivot member.

23. The pressing device as defined in claim 1, wherein said first auxiliary press member is preloaded into a circumferentially spaced position with respect to said first and second press members, and wherein said second auxiliary press member is preloaded into a circumferentially spaced position with respect to said first and second press members.

24. The pressing device as defined in claim 23, wherein said preloading of said first auxiliary press member is achieved by a first spring element, and wherein said preloading of said second auxiliary press member is achieved by a second spring element.

25. The pressing device as defined in claim 24, wherein said first spring element is active between said first auxiliary press member and said second pivot member, with a positively locking movement restriction between said first auxiliary press member and said second pivot member, and wherein said second spring element is active between said second auxiliary press member and said fourth pivot member, with a positively locking movement restriction between said second auxiliary press member and said fourth pivot member.

26. The pressing device as defined in claim 25, wherein the positively locking movement restrictions are achieved by pegs.

* * * * *

UNITED STATES PATENT AND TRADEMARK OFFICE

CERTIFICATE OF CORRECTION

PATENT NO. : 7,788,779 B2
APPLICATION NO. : 10/498023
DATED : September 7, 2010
INVENTOR(S) : Egbert Frenken It is certified that error appears in the above-identified patent and that said Letters Patent is hereby corrected as shown below:

Column 7, Line 9 “tensile three” should read -- tensile force --

Signed and Sealed this
Fifth Day of April, 2011

David J. Kappos
*Director of the United States Patent and Trademark Office*